United States Patent [19]

Smith et al.

[11] 4,411,576
[45] Oct. 25, 1983

[54] PICK AND PLACE MECHANISM

[75] Inventors: William I. Smith, 59 Shannon Dr., North Wales, Pa. 19454; Harold Moyer, Harleysville, Pa.

[73] Assignee: William I. Smith, Collegeville, Pa.

[21] Appl. No.: 296,504

[22] Filed: Aug. 26, 1981

[51] Int. Cl.³ .................................. B23Q 7/04
[52] U.S. Cl. ......................... 414/226; 414/744 A; 414/753; 294/95; 294/116
[58] Field of Search ........... 414/744 A, 744 B, 744 C, 414/730, 753, 751, 226, 225; 294/95, 116

[56] References Cited

U.S. PATENT DOCUMENTS

| | | | |
|---|---|---|---|
| 3,175,705 | 3/1965 | Houda, Jr. | 414/744 A |
| 3,601,264 | 8/1971 | Ritter, Jr. | 214/1 BH |
| 3,812,981 | 5/1974 | Potter | 214/1 BB |
| 3,857,496 | 12/1974 | Gonzales | 214/1 BT |
| 4,027,767 | 6/1977 | Gluck | 198/339 |
| 4,113,115 | 9/1978 | Yoshio | 414/744 A |
| 4,139,104 | 2/1979 | Mink | 214/1 BB |
| 4,227,851 | 10/1980 | Beezer | 414/626 |
| 4,234,223 | 11/1980 | O'Neil | 294/116 X |
| 4,299,532 | 11/1981 | Bouwmeester | 294/116 X |
| 4,343,584 | 8/1982 | Hudgins | 414/226 X |

*Primary Examiner*—Robert J. Spar
*Assistant Examiner*—Terrance L. Siemens

*Attorney, Agent, or Firm*—Howson and Howson

[57] ABSTRACT

A pick and place mechanism is provided for selecting a part from a pick-up location, transporting the same to a place location, and placing it in a precise position at the place location. A part is engaged by a pair of gripping fingers which depend from a casing mounted for movement between the pick and place locations. The fingers are connected to a cam mounted for reciprocation in the casing to alternately extend and retract the fingers. The fingers cooperate with an actuating mechanism carried by the casing to engage and disengage the part in response to movement of the cam. The cam is normally biased upwardly and is actuated by a follower which is guided in a slot in the casing, and an air cylinder drives the follower and hence the casing between the pick and place locations. Stops are provided at the pick and place locations for engaging the casing to arrest its motion and thereby causing the follower to move relative to the cam for extending and retracting the fingers and causing the same to be actuated. In one embodiment, the casing is mounted on an arm which pivots about an upright axis, and the follower is mounted on a similarly pivoted arm. In the other embodiment, the casing is mounted for sliding movement on guide rods extending between the pick and place locations.

33 Claims, 13 Drawing Figures

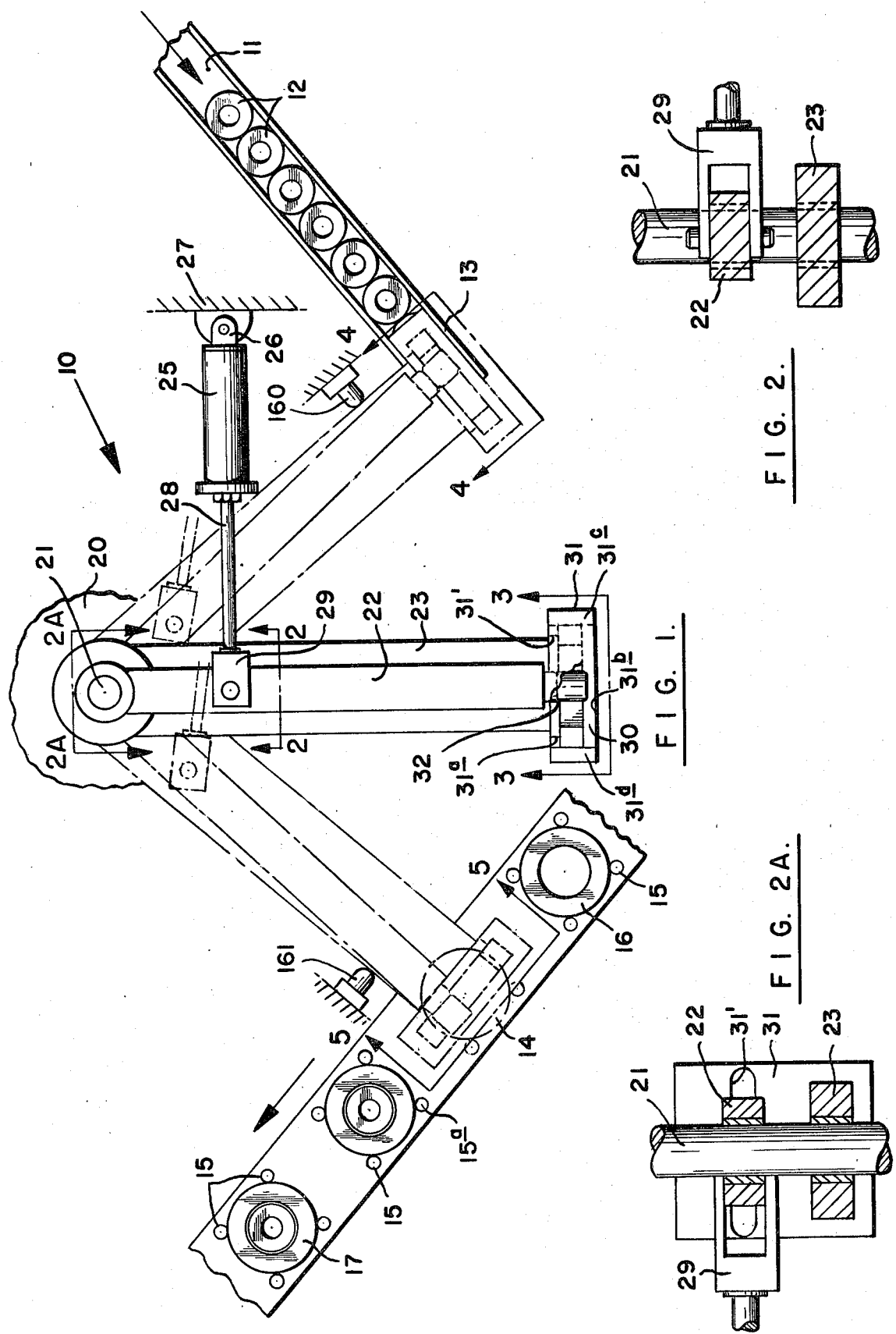

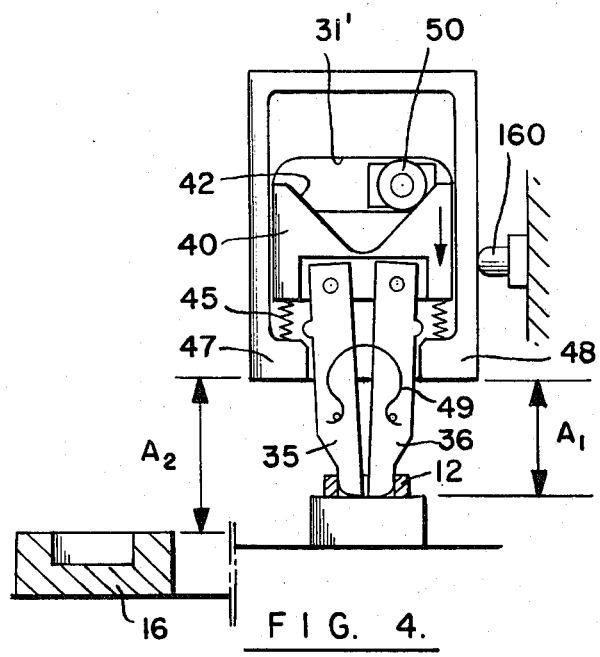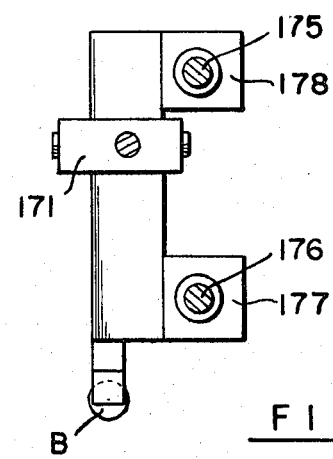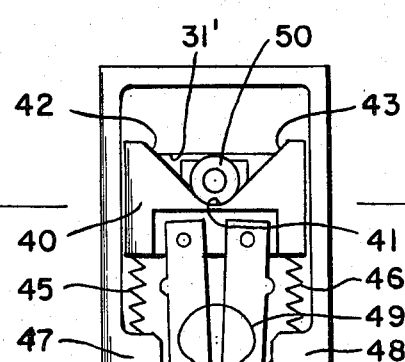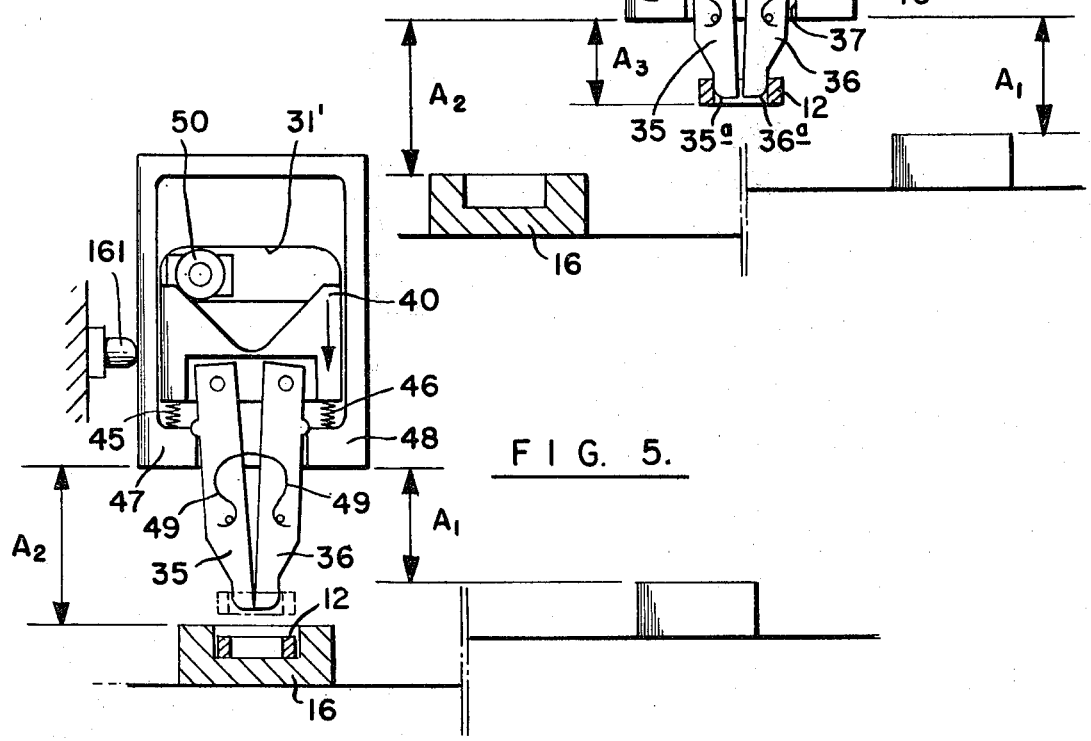

PICK AND PLACE MECHANISM

FIELD OF THE INVENTION

The present invention relates to parts transfer mechanisms, and more particularly, the present invention relates to a mechanism designed to pick a part from one location, to transfer the part to another location, and to place the part in a precise position at that other location.

BACKGROUND OF THE INVENTION

In recent years, increased emphasis has been placed on automated manufacturing processes. Such processes often include an automatic parts feeding mechanism which delivers parts one by one to a parts pick-up location and a parts carrier located at a parts placement location adjacent the parts feeder for moving the part to a work station, such as an assembly station, an inspection station, etc. The function of a pick and place mechanism is to grip a part supplied by the parts feeder, to transport it in a predetermined path to the carrier, and there to place the picked part in a precise location on the carrier. The carrier may also deliver complementary parts at the place location so that the parts may be assembled thereat. A desirable pick and place mechanism should be capable of performing such operations at relatively high rates of speed and with great accuracy.

Various types of pick and place mechanisms have been proposed. Examples may be found in the following U.S. Pat. Nos.: 3,601,264; 3,812,981; 3,857,496; 4,027,767; 4,139,104; and 4,227,851. While each of these patented mechanisms may function satisfactorily for its intended purpose, each is characterized by a relatively complex mechanism required to perform its function. Complex mechanisms are undesirable not only because of their greater costs of manufacture and maintenance, but also because they create synchronization problems which are usually solved by complex electronic or pneumatic circuitry. Accordingly, known pick and place mechanisms have not been entirely satisfactory.

OBJECTS OF THE INVENTION

With the foregoing in mind, an object of the present invention is to provide a pick and place mechanism which overcomes the limitations of known pick and place mechanisms.

It is another object of the present invention to provide an improved pick and place mechanism which is relatively simple in construction and which, therefore, can be manufactured relatively economically.

A further object of the present invention is to provide a novel pick and place mechanism which is highly accurate in operation.

A still further object of the present invention is to provide a pick and place mechanism which utilizes a single actuator to perform its function and which, therefore, avoids the need for complex synchronization circuitry.

SUMMARY OF THE INVENTION

More specifically, the present invention provides a mechanism for use in selecting a part from a pick-up location, transferring the part to a place location, and then precisely positioning the part at the place location. To this end, part gripping means is mounted for extension and retraction in a casing which reciprocates between the pick and place locations. The pick-up means is coupled to an upwardly-biased cam which is mounted for vertical reciprocation in the casing in response to movement of a follower engaged with the cam profile. Means is provided for guiding the casing in a predetermined path between the pick and place locations, and means is provided for arresting motion of the casing at those locations. Means connected to the follower displaces the follower and the casing between the locations and operates, when the movement of the casing is arrested at each location, to cause the follower to over-travel relative to the casing for displacing the cam downwardly and extending the pick-up means and actuating the same either to pick-up or to place a part. In one embodiment, the casing is mounted on the end of an arm which pivots about a vertical axis, and the follower is connected to a similarly mounted arm which is pivoted by means of an air cylinder. In the other disclosed embodiment, the casing is guided in a linear path by guide rods, and the air cylinder is connected directly to the follower.

BRIEF DESCRIPTION OF THE DRAWINGS

The foregoing and other objects, features and advantages of the present invention should become apparent from the following description when taken in conjunction with the accompanying drawings, in which:

FIG. 1 is a fragmentary plan view with portions broken away of a pick and place mechanism embodying the present invention;

FIG. 2 is a fragmentary sectional view taken on line 2—2 of FIG. 1;

FIG. 2A is a partially sectioned fragmentary view taken on line 2A—2A of FIG. 1;

FIG. 3 is a side view of a portion of the pick and place mechanism illustrated in FIG. 1, the view illustrating the relative positions of the elements during transport of a part;

FIG. 4 is a view similar to FIG. 3 but illustrating the relative positions of the parts during the pick-up phase of the operating cycle;

FIG. 5 is a view similar to FIG. 3 but illustrating the relative position of the parts during the place phase of the operating cycle;

FIG. 12 is a view taken on line 12—12 of FIG. 9.

DESCRIPTION OF PREFERRED EMBODIMENTS

Figure 6:
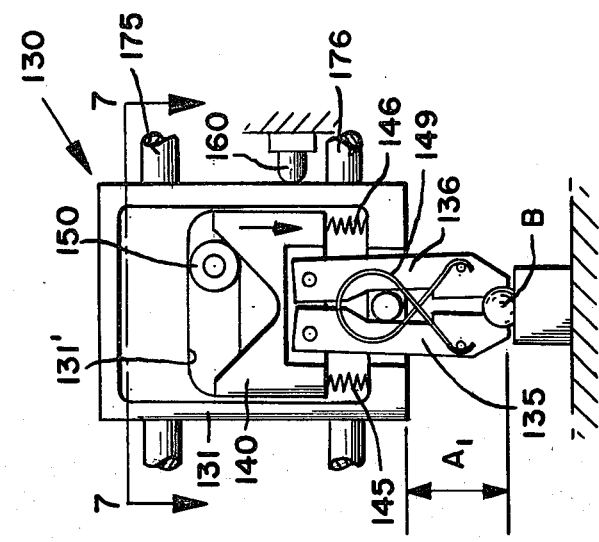
FIG. 6 is a view of a modified embodiment of the present invention, wherein the parts are gripped on the outside and are transferred in a linear path between the pick-up location of FIG. 6 and the placement location of FIG. 10.
Figure 7:
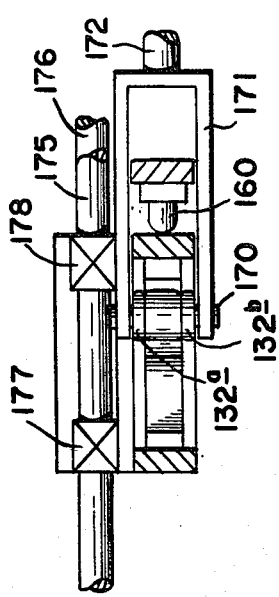
FIG. 7 is a view taken on line 7—7 of FIG. 6.

Referring now to the drawings, FIG. 1 illustrates one embodiment of a pick and place mechanism 10 constructed in accordance with the present invention. While the pick and place mechanism 10 may be used in any application where a parts transfer function is desired, it is particularly suited for use in an automated assembly process wherein an automatic parts feeder, such as a vibratory type feeder, having an outlet trough 11 delivers a series of like parts 12,12 in the direction indicated by the arrow to the parts pick-up location 13. Parts which are to be assembled with the part 12 are delivered to a place location 14 on a carrier 15 having peripheral locator pins 15a for precisely positioning the part 16. The carrier 15 is preferably advanced stepwise and may include a conventional air-operated indexing table. A typical part 16 is shown advancing in the direction indicated by the arrow to the place location 14, and an assembly of parts 17 is shown leaving the place location. By way of example, the part 12 may include a bushing and the part 16 may include a housing fixtured on the carrier 15.

The pick and place mechanism 10 functions to grip a part 12 at the pick location 13, to lift and transport the part 12 in a clockwise direction in an arcuate path to the place location 14, and there to position the part 12 precisely as by assembling the part 12 with the complementary part 16 fixtured on the carrier 15. As noted heretofore, various mechanisms have been provided to perform this function. However, to date, known mechanisms have been complex, expensive to manufacture and maintain, and require complicated synchronization.

For the purpose of gripping, transporting and releasing the part 12, a parts handling assembly 30 is mounted for movement relative to a base 20 which, for purposes of clarity, is shown in fragment. In this embodiment, the parts gripping assembly 30 is located at the outer ends of a pair of arms 22 and 23 which extend radially outward from a shaft 21 which projects upwardly from the base 20. The first or upper arm 22 extends alongside and preferably parallel to the lower arm 23 which may be wider than the upper arm 22 such as illustrated. For the purpose of pivoting the arms 22 and 23 about the shaft 21, an air cylinder 25 is pivotally mounted at one end 26 to a bracket 27 carried by the base 20. The air cylinder 25 has a rod 28 which is connected to the upper arm 22 by a clevis 29. Thus, extension and retraction of the rod 28 pivots the upper arm 22 in either a clockwise or a counterclockwise direction about the shaft 21 to move the parts gripping assembly in an arcuate path as will be discussed.

As best seen in FIG. 2A, the parts gripping assembly 30 comprises a casing 31 which is mounted to the outer end of the lower arm 23 for movement therewith in an arcuate path. The casing 31 has an inner wall 31a (FIG. 1) which is attached to the arm 23 and which has a horizontally elongated slot 31' (FIGS. 1 and 2A) for receiving a roller 32 mounted for rotation on the outer end of the upper arm 22. The casing 31 also has an outer wall 31b which, for purposes of illustration, may be regarded as being fabricated of clear plastic in order to enable details of construction on the inside of the casing 31 to be shown in full lines. The casing 31 also has a pair of end walls 31c and 31d at opposite ends of the inner and outer walls 31a and 31b.

A parts pick-up means is carried by the casing 31. In the embodiment in FIG. 3 (sheet 2) the parts pick-up means includes a pair of elongated gripping fingers 35 and 36 which depend through a slot 37 provided in the bottom of the casing 31. The gripping fingers 35 and 36 are mounted for extension and retraction relative to the casing 31 which, in the present instance, moves in a horizontal path above the pick and place locations. In this embodiment, the fingers 35 and 36 are provided with chamfered lower ends 35a and 36a for engaging the inside diameter of the part 12, and the fingers 35 and 36 are urged apart by a wire form elastic or spring element 49 connected to the fingers in the manner illustrated. Thus, the wire form 49 urges the lower ends 35a and 36a of the fingers 35 and 36 apart for frictionally engaging the interior of the part 12 after the fingers 35 and 36 have been forced downwardly against the part 12. If desired, other gripping means may be utilized for other applications, including vacuum grippers, magnetic grippers, and the like.

In order to move the fingers 35 and 36 vertically relative to the casing 31, a cam element 40 is mounted for reciprocation in the casing 31, and the fingers 35 and 36 are pivotally connected at their upper ends to the cam element 40 so that they move vertically in response to reciprocation of the cam element 40. The cam element 40 has a concave camming surface which, in the illustrated embodiment, has a V-shaped configuration with a central dwell surface 41 and a pair of rise surfaces 42 and 43 extending upwardly from the dwell surface 41. The cam element 40 is biased upwardly in the casing 31 by a pair of compression springs 45 and 46 interposed between the underside of the cam and inturned bottom flanges 47 and 48 of the end walls 31c and 31d, respectively. If desired, the cam element 40 may be provided with a profile defined by a V-shaped slot milled in the cam element 40.

In order to reciprocate the cam element 40 in the casing 31 and hence alternately to extend and retract the gripping fingers 35 and 36, a cam follower 50 is provided in the casing 31 for engaging the cam profile 41–43. As best seen in FIG. 1, the cam follower 50 is mounted for rotation on the outer end of the upper arm 22 coaxial with the roller 32. The cam follower 50 is normally engaged with the dwell surface 41 because of the upward bias applied to the cam element 40 by the compression springs 45 and 46. Thus, the normal extension of the fingers is indicated at $A_3$ (FIG. 3). However, when the cam follower 50 is displaced rightward relative to the cam element 40, it cooperates with the rise surface 43 to displace the cam element 40 downwardly and thereby to extend the fingers 35 and 36. In a like manner, displacement of the cam follower leftward relative to the cam element 40 causes it to cooperate with the rise surface 42 for likewise displacing the cam element 40 downwardly to extend the fingers 35 and 36. The interaction of the roller 32 with the upper edge of the slot 31' provided in the rear wall 31a of the casing 31 insures the application of downward pressure between the cam follower 50 and the rise surfaces 42 and 43 and thereby minimizes stresses and hence wear.

The upward bias on the cam element 40 provided by the compression springs 45 and 46 is sufficient to cause the upper and lower arms 22 and 23 normally to extend parallel with one another in the manner illustrated in FIG. 1. When in this relation, extension and retraction of the air cylinder rod 28 operates by virtue of its connection to the upper arm 22 to displace both arms 22 and 23 between the pick and place locations 13 and 14, respectively. Thus, during transport, the arms 22 and 23 and the gripping assembly 30 are disposed in the manner illustrated in FIGS. 1 and 3.

The gripping fingers 35 and 36 are extended at the pick and place locations for picking up and releasing the part 12. In the present invention, this action is achieved by causing the upper arm 22 to overtravel relative to the lower arm 23 at the pick and place locations and thereby causing the cam follower 50 to urge the cam 40 and the fingers 35 and 36 downwardly. To provide the desired overtravel, a stop 160 is provided adjacent the pick location 13, and a stop 161 is provided adjacent the place location 14. (See FIG. 1). The stops 60 and 61 are located in the path of movement of the lower arm 23 and function, when engaged by the lower arm 23, to arrest motion of the lower arm 23 and hence to stop the motion of the casing 31 connected thereto. However, the stroke of the cylinder 25 is such that the upper arm 22 continues to pivot relative to the lower arm 23 after the motion of the lower arm 23 has been arrested. This, in turn, causes the follower 50 either to engage the rise surface 43 at the pick location 13 when the cylinder rod 28 retracts, or to engage the rise surface 24 at the place location 14 when the cylinder rod 28 extends for urging the cam element 40 downwardly to extend the gripping fingers 35 and 36.

The foregoing action may best be seen by reference to FIGS. 3, 4 and 5. FIG. 3 illustrates the relative relationship of the cam follower 50 with respect to the cam element 40 and the disposition of the gripping fingers 35 and 36 in their retracted positions during transport of the part 12 in the direction indicated by the arrows. This view corresponds to the full line view illustrated in FIG. 1. In picking up the part 12 at the pick location 13, the fingers 35 and 36 extend when the cam follower 50 moves rightward relative to the cam surface 43 when the motion of the casing 31 is arrested by engagement of the stop 60 with the lower arm 23. However, because the fingers 35 and 36 are biased outwardly by the wire form 49, and their lower ends 35a and 36a are rounded or chamfered, they move toward one another against the bias of the wire form 49 as their lower ends are forced downwardly into the inside of the part 12 during downward motion of the cam 40. Thus, the wire form 49 causes the lower ends 35a and 36a of the fingers 35 and 36 to frictionally engage the inside of the part 12 so that it can be lifted upwardly from the pick location 13. The extent of the finger extension during parts pick-up is indicated by $A_1$ in FIGS. 3 and 4. It is noted that in picking up the part 12, the fingers 35 and 36 are extended less than their full range of extension.

For the purpose of releasing the part 12 after it has been transported to the place location 14 and precisely located as for assembly with its complementary part 16, cooperating camming means is provided on the fingers and in the casing for causing the fingers to release the part 12 when the fingers are extended through a greater distance than required for picking up the part 12. As best seen in FIG. 5, this action is accomplished by protrusions 65 and 66 on the outboard sides of the fingers 35 and 36, respectively which cooperate with chamfered shoulders 47' and 48' on inturned lower flanges 47 and 48 of the casing end walls. The complementary part 16 is disposed at a level lower than the level of the part 12 at the pick-up location 13. As a result, when the fingers 35 and 36 are displaced downwardly through a greater distance than required for pick-up (indicated by $A_2$ in FIG. 5) the protrusions 65 and 66 engage the shoulders 47' and 48' to pivot the fingers 35 and 36 inwardly against the bias of the wire form 49. When thus pivoted, the lower ends 35a and 36a of the fingers 35 and 36 release their frictional grip with the part 12 to enable the part 12 to drop by gravity into the complementary part 16 on the carrier 15. Preferably, the fingers extend about ⅛ inch further downward during placement of the part 12 than during pick-up thereof. This may be accomplished readily by causing the level of the pick-up location 13 to be higher than the level of the place location 14 by a sufficient distance to accommodate the additional movement. Preferably the stroke of the air cylinder rod 28 is adjusted to cause the bottoms of the fingers 35 and 36 to engage the trough 11 and to stall the air cylinder.

Thus, by alternately extending and retracting the air cylinder rod 28, and without requiring further mechanisms and synchronization, part 12 may be picked up at the pick location 13, transported to the place location 14, and assembled with complementary part 16. The pick and place mechanism 10 has been found to be highly accurate in operation, even after prolonged usage. Moreover, because only a single air cylinder 25 is required, the mechanism is relatively trouble-free in operation.

In the embodiment illustrated in FIGS. 1–5, the fingers 35 and 36 operate to grip the inside of the part 12, and the gripping assembly moves in an arcuate path between the pick location 13 and the place location 14. In some instances, however, it may be desirable to grip the outsides of parts and/or to move the parts in a straightline path between the pick and place locations. To this end, the embodiment illustrated in FIGS. 6–12 has been provided.

Figure 8:
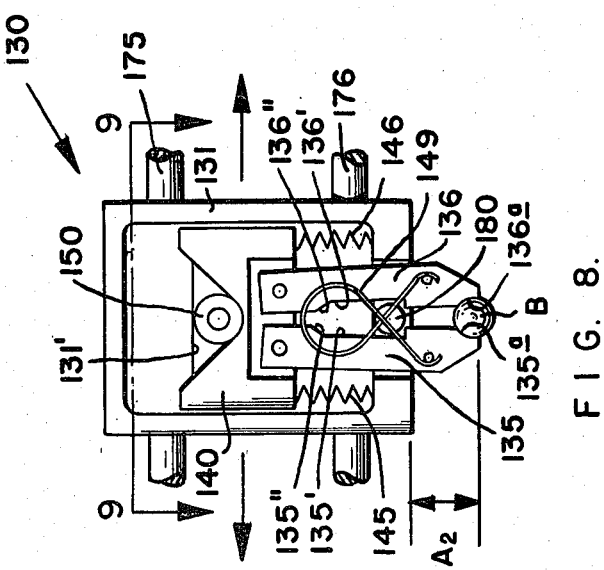
FIG. 8 is a view similar to FIG. 6 but illustrating the relative positions of the elements during transport of a part.
Figure 9:
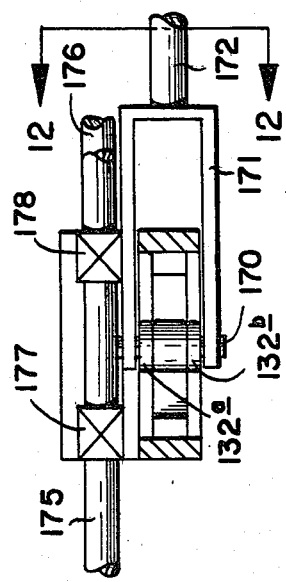
FIG. 9 is a view taken on line 9—9 of FIG. 8.

As best seen in FIG. 8, the gripping assembly 130 is like in construction to the gripping assembly 30 illustrated in FIG. 3. The assembly 130 includes a casing 131 mounting a cam element 140 for reciprocation vertically therein. A pair of compression springs 145 and 146 urge the cam element 140 upwardly against the follower 150 which displaces the cam element 140 downwardly when moved horizontally relative to the casing 131. As best seen in FIG. 9, a pair of rollers 132a and 132b are mounted for rotation coaxial with the follower 150 on an axle 170 carried in a clevis 171 mounted at the end of a rod 172 connected to an air cylinder (not shown). The rollers 132a and 132b engage in slots in the rear and front walls of the casing 131, such as the slot 131' illustrated in FIG. 8.

In order to guide the gripping assembly 130 in a linear path, a pair of guide rods 175 and 176 are disposed in vertically spaced parallel relation above the pick and place locations. The guide rods, such as the upper guide rod 175, are received in linear bearings 177 and 178 mounted to the rear wall of the casing 131. See FIG. 12 (sheet 2). As with the previous embodiment, the compression springs 145 and 146 bias the cam element 140 into engagement with the follower 150 so that movement of the air cylinder rod 172 causes the entire gripping assembly to move either rightward or leftward in the direction indicated by the arrows in FIG. 8.

Figure 10:
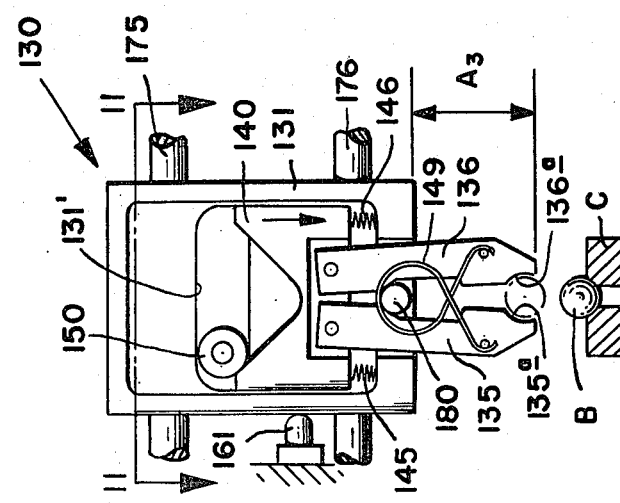
FIG. 10 is a view similar to FIG. 6 but illustrating the relative positions of the parts during the place phase of the operating cycle.
Figure 11:
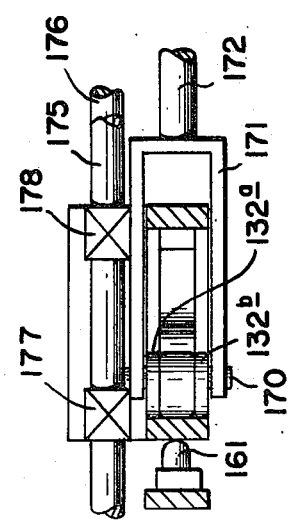
FIG. 11 is a view taken on line 11—11 of FIG. 10.

As in the previous embodiment, the cam element 140 is urged downwardly when the casing 131 engages stops at the pick and place locations, such as the stop 160 at the pick location (FIG. 6) and the stop 161 at the place location (FIG. 10). Thus, when the motion of the casing is arrested by the stop 160 at the pick location, the follower 150 travels in its slot 131' to urge the cam element 140 downwardly and hence to extend the gripping fingers. In a like manner, the stop element 161 (FIG. 10) operates to arrest motion of the casing at the place location while permitting the cam follower 150 to drive the cam element and the gripping fingers downwardly.

In the embodiments of FIGS. 1–5, the gripping fingers engage the interior of the part to be assembled. In this embodiment, however, the gripping fingers are designed to engage the exterior of the part to be assembled. It should be understood, however, that either the inside or outside gripping finger arrangement can be used in either embodiment in connection with either an arcuate or straightline motion of the gripping assembly. Moreover, on some parts, the lower ends of the gripping fingers may be fashioned with opposed fish-hook like chamfered surfaces and shoulders to provide a latching action when forced downwardly against a part.

Referring again to FIG. 8, the gripping fingers 135 and 136 are pivotally connected at their upper ends to the cam element 140 for extension and retraction in response to reciprocation of the cam element 140 in the casing 131. The lower ends 135a and 136a of the gripping fingers 135 and 136 are provided with suitable shapes, such as the recess for engaging parts such as the ball B indicated in FIG. 8. The gripping fingers 135 and 136 are biased toward one another by a wire form spring element 149 connected to the spring elements in the manner shown. Thus, when the fingers 135 and 136 are extended in the pick location, such as indicated in FIG. 6, the inner surfaces 135a and 136a engage the outside of the part B, and the friction provided by the wire form spring 149 enables the part B to be lifted and transported to the place location indicated in FIG. 10.

For the purpose of releasing the outside gripped part B at the place location, the inboard sides of the fingers 135 and 136 are provided with lengthwise extending recesses 135' and 136' which terminate adjacent their upper ends in chamfered surfaces 135'' and 136''. A complementary cam element, in the present instance a cylindrical pin 180, is provided adjacent the bottom of the casing 131 in the path of movement of the tapered surfaces 135'' and 136''. As a result, as best seen in FIG. 10, when the gripping fingers 135 and 136 are extended in response to downward motion of the cam element 140 at the place location, the tapered surfaces 135'' and 136'' engage the pin 180 to cause the lower ends 135a and 136a of the gripping fingers 135 and 136 to spread apart against the bias of the wire form 149 for releasing their frictional grip with the ball B. The ball B then drops freely into assembled relation with its complementary part C at the place location. As in the preceding embodiment, the gripping of the part B takes place with the fingers extended less than their full extent while release of the part B takes place when the fingers are extended through a greater distance. Compare $A_1$, $A_2$ and $A_3$.

In view of the foregoing, it should be apparent that the present invention now provides an improved pick and place mechanism which requires only a single linear actuator to perform all of the various operations including picking, transporting and placing parts. The pick and place mechanism does not, therefore, require complex pneumatic or electrical synchronization circuitry. Moreover, the pick and place mechanism of the present invention is capable of placing parts accurately at predetermined locations even after prolonged periods of use.

Thus, while preferred embodiments of the present invention have been described in detail, various modifications, alterations and changes may be made without departing from the spirit and scope of the present invention as defined in the appended claims.

We claim:

1. A pick and place mechanism for transferring a part from a pick location to a place location, comprising:
   a casing,
   means for displacing said casing in a predetermined path of movement between said locations,
   means at each location for arresting motion of said casing,
   cam means mounted in said casing for movement transversely to said path of movement,
   follower means disposed in said casing for operating said cam means in response to arrested motion of said casing at said locations,
   at least a pair of gripping fingers connected to said cam means and mounted in said casing for extension and retraction relative thereto, and
   actuating means on said gripping fingers and said casing cooperable upon extension of said fingers through predetermined distances to grip or release a part.

2. The pick and place mechanism according to claim 1 wherein said cam means has a dwell surface and a pair of rise surfaces extending away from said dwell surface, and said casing has at least one side wall with a slot for guiding said follower means in said path of movement, whereby movement of the follower means in each direction from said dwell surface causes the gripping fingers to extend.

3. The pick and place mechanism according to claim 2 including elastic means mounted in said casing for biasing said cam means against said follower means to cause said follower means to normally engage said dwell surface.

4. The pick and place mechanism according to claim 3 wherein said cam means has a generally V-shaped configuration defining said dwell and rise surfaces.

5. The pick and place mechanism according to claim 4 wherein said follower means includes a first roller engaging said cam surfaces and a second roller engaging said slot in said casing side wall.

6. The pick and place mechanism according to claim 5 wherein said casing displacing means includes a first arm extending away from said follower and mounting said follower rollers, a second arm connected to and extending away from said casing alongside said first arm, means mounting said arms for pivotal movement about a common axis remote from said casing, and means connected to said second arm for pivoting the same about said axis, whereby the first and second arms move together during the transport phase of operation and move relative to one another when motion of the casing is arrested at the pick and place phases of operation.

7. The pick and place mechanism according to claim 6 wherein said casing motion arresting means includes a stop engageable by said second arm at the pick and place locations, whereby the first arm overtravels relative to the second arm for displacing the follower, the cam and hence the gripping fingers.

8. The pick and place mechanism according to claim 7 including drive means connected to said second arm for pivoting the same about said axis.

9. The pick and place mechanism according to claim 5 wherein said casing displacing means includes guide means slidably mounting said casing for movement in said predetermined path, and said casing arresting means includes a pair of stops located in the path of movement of said casing at said pick and place locations.

10. The pick and place mechanism according to claim 9 wherein said guide means includes at least one rod disposed alongside said casing and defining said path of movement, and linear bearing means mounted to said casing and slidably receiving said rod.

11. The pick and place mechanism according to claim 9 including drive means connected to said follower for displacing the follower, the cam and hence the gripping fingers.

12. The pick and place mechanism according to claim 1 wherein at least one of said fingers is pivotally connected at one end to said cam means for movement toward and away from the other finger, and said actuating means includes cooperating cam surfaces on said casing and said one finger for pivoting said one finger relative to the other after said one finger has been extended from said casing a predetermined extent, and means connected to said one finger for biasing it relative to the other finger.

13. The pick and place mechanism according to claim 12 wherein both fingers are of like construction and are similarly mounted and associated with like structure in said casing for moving toward and away from one another in response to movement of said cam means.

14. The pick and place mechanism according to claim 12 wherein said fingers are shaped on their free ends to engage frictionally the interior of a part to be transferred, and said actuating means includes a protrusion on said one finger adjacent its pivot connection to said cam means and a shoulder on said casing in the path of movement of said cam means, and said biasing means includes a spring member operable to pivot said one finger outwardly relative to the other.

15. The pick and place mechanism according to claim 12 wherein said fingers are shaped at their free ends to engage frictionally the exterior of a part to be transferred, and said actuating means includes an inclined surface on said one finger and a shoulder on said casing intermediate said fingers and in the path of movement of said cam means, and said biasing means includes a spring member operable to pivot said one finger inwardly relative to the other.

16. The pick and place mechanism according to claim 12 including means providing a first part support surface in the path of movement of said fingers at the pick location and means providing a second support surface in the path of movement of said fingers at the part placement location, said first surface being at a higher level than said second surface.

17. A pick and place mechanism comprising:
a casing,
means mounting said casing for movement horizontally between said locations,
a pair of gripping fingers depending from said casing and mounted therein for vertical extension and retraction, said fingers having free ends adjacent their lower ends for engaging a part,
elastic means connected to said fingers for biasing their free ends into frictional engagement with said part,
complementary camming surfaces on said fingers and said casing operable upon extension of said fingers beyond said one level to overcome the bias of said elastic means for releasing said frictional grip on said part,
a cam mounted in said casing for vertical reciprocation and connected to said fingers for extending and retracting the same,
means biasing said cam upwardly in said casing for causing said gripping fingers to assume a normally retracted position,
a follower engaging said cam in said casing and operable when moved horizontally to displace said cam downwardly for extending said gripping fingers,
means for reciprocating said follower and said casing between said pick and place locations, and
means for arresting motion of said casing at said pick and place locations for causing said follower to overtravel relative to said casing and thereby displacing said cam and fingers downwardly.

18. The pick and place mechanism according to claim 17 wherein said cam has a concave camming surface with said biasing means operable to cause said follower normally to engage in the lowermost portion of said surface.

19. The pick and place mechanism according to claim 18 wherein said concave surface has a V-shaped configuration with a pair of rise surfaces ascending from a lowermost dwell surface normally engaged by said follower.

20. The pick and place mechanism according to claim 19 wherein said casing has at least one side wall, and said side wall has a slot extending transversely with respect to the path of movement of said cam and having a downwardly facing edge, said follower engaging said slot edge and operable when displaced relative to said casing to apply pressure between said edge and said rise surfaces for displacing said cam and said gripping fingers downwardly.

21. The pick and place mechanism according to claim 20 wherein said follower includes a pair of tandem rollers rotatable on a common axis with one roller engaging said cam surface and the other roller engaging said slot edge.

22. The pick and place mechanism according to claim 17 wherein said casing has inturned flanges in its lower end defining a gap for receiving said fingers, and said biasing means includes a pair of compression springs interposed between said flanges and the underside of said cam.

23. The pick and place mechanism according to claim 17 wherein said gripping fingers have upper ends pivotally connected to said cam so as normally to depend therefrom in substantially parallel relation, said free ends of said fingers having chamfers adapted to force said fingers together against said elastic means when said fingers are forced downwardly to establish said part gripping friction.

24. The pick and place mechanism according to claim 23 wherein said complementary camming surfaces on said fingers and said casing include a protrusion on the outboard side of each finger and a shoulder in the bottom of said casing in the path of movement of each protrusion for forcing the lower ends of said fingers inwardly to release a friction gripped part.

25. The pick and place mechanism according to claim 17 wherein said gripping fingers have upper ends pivotally connected to said cam so as normally to depend therefrom in substantially parallel relation, said free ends of said fingers being shaped to engage outer surfaces of a part to effect the frictional grip.

26. The pick and place mechanism according to claim 25 wherein each finger has a tapered cam surface on its inner side adjacent its pivot connection to said cam, and including a pin in the bottom of said casing adapted to engage said tapered cam surfaces as said fingers move downwardly for spreading said fingers and releasing said friction grip.

27. The pick and place mechanism according to claim 17 wherein said casing mounting means includes a first arm mounted to pivot about an axis, and said follower reciprocating means includes a second arm extending alongside said first arm and mounted to pivot about said axis and means for pivoting said second arm about said axis.

28. The pick and place mechanism according to claim 27 wherein said second arm overlies said first arm and is normally disposed parallel therewith, and said second arm pivoting means includes an air cylinder connected to said second arm.

29. The pick and place mechanism according to claim 27 wherein said casing mounting means includes guide rod means extending between said locations and means on said casing slidably receiving said guide rod means.

30. A pick and place mechanism, comprising:
a casing,
means mounting said casing for reciprocation between a part pick-up location and a part place down location,
a cam mounted for vertical oscillation in said casing, said cam having a concave camming surface,
a follower engaging said camming surface,
means on said casing guiding said follower for horizontal movement relative to said camming surface,
means biasing said cam upwardly for causing said follower normally to engage the bottom of said camming surface,
gripping finger means carried in said casing and mounted for vertical extension and retraction relative thereto in response to vertical motion of said cam,
actuating means carried in said casing and cooperable with said gripping finger means to frictionally engage a part when said gripping finger means are extended to one level and to release said frictional engagement when said gripping finger means are extended to another level lower than said one level,
means connected only to said follower for reciprocating said casing between said locations, and
means at each location for arresting motion of said casing while allowing said follower to overtravel relative to the casing,
whereby the follower operates through the cam to move the casing while overtravel of the follower when motion of the casing is arrested causes the cam to move downwardly at said locations for extending said gripping finger means to said predetermined levels for alternately picking-up, transporting, and placing down parts.

31. A pick and place mechanism, comprising:
a casing,
means mounting said casing for reciprocation between a part pick-up location and a part place-down location,
a cam mounted for oscillation in said casing and having a substantially V-shaped profile,
a follower engaging said camming profile,
means biasing said cam upwardly for causing said follower normally to engage the lowermost level of said camming profile,
part engaging means carried by said casing and mounted for extension and retraction relative thereto in response to motion of said cam,
means connected to said follower for reciprocating said casing between said locations, and
means at each location for arresting motion of said casing while allowing said follower to overtravel relative to the casing,
whereby the follower operates through the cam to move the casing between the pick and place locations while overtravel of the follower causes the cam to move downwardly when motion of the casing is arrested at the pick and place locations for extending the part engaging means for alternately picking up, transporting, and placing parts.

32. A pick and place mechanism according to claim 31 wherein said part engaging means includes a pair of gripping fingers depending from said cam through a slot in the bottom of the casing, and actuating means carried in said casing and cooperable with said gripping fingers to engage a part when said gripping fingers are extended to one level and to release said engagement when said gripping fingers are extended to another level lower than said one level.

33. A pick and place mechanism according to claim 32 including an automatic parts feeder for delivering parts at one level to a pick-up location and a carrier for accepting the parts at a place location at a level lower than the pick location.

* * * * *